A. R. MOSLER.
GASKET.
APPLICATION FILED SEPT. 16, 1916.

1,312,338.

Patented Aug. 5, 1919.

Inventor:
Arthur R. Mosler
by attorneys
Brown & Seward

UNITED STATES PATENT OFFICE.

ARTHUR R. MOSLER, OF NEW YORK, N. Y.

GASKET.

1,312,338.      Specification of Letters Patent.      Patented Aug. 5, 1919.

Application filed September 16, 1916. Serial No. 120,524.

*To all whom it may concern:*

Be it known that I, ARTHUR R. MOSLER, a citizen of the United States, and resident of the borough of Manhattan, in the city and State of New York, have invented a new and useful Improvement in Gaskets, of which the following is a specification.

The object of my invention is particularly to provide certain improvements in gaskets for use in spark plugs whereby a gas-tight joint may be obtained between the insulator and the shell without danger of cracking or breaking the insulator.

My improved gasket comprises a sheet metal casing having an annular slot in its lateral top wall, and a filling of yielding packing material projecting through said annular slot into engagement with the usual shoulder on the insulator, thereby adapting the gasket to any unevenness in the shoulder due to inaccuracy of manufacture, and thereby form a gas-tight joint without requiring an undue strain being placed upon the insulator.

A practical embodiment of my invention is represented in the accompanying drawings, in which—

Figure 1:
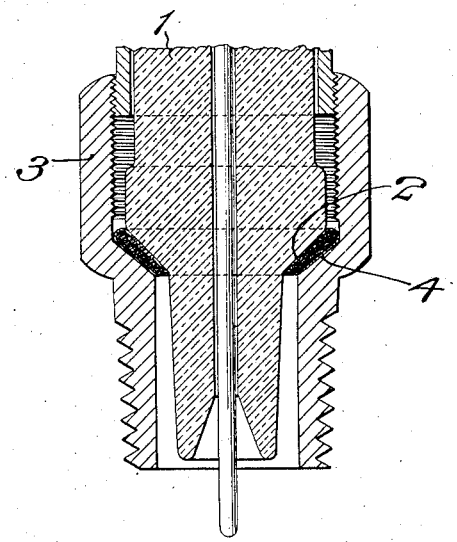
Figure 2:
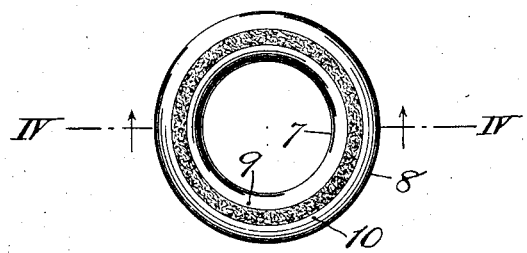
Figure 3:
Figure 4:
Figure 5:
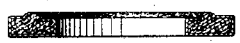

Figure 1 represents in longitudinal central section so much of a spark plug as will illustrate my invention, Fig. 2 is a top plan view of the gasket, Fig. 3 is a side view of the same, Fig. 4 is a section taken in the plane of the line IV—IV of Fig. 2, and Fig. 5 is a similar section showing a slightly modified shape for the gasket casing.

The insulator 1 of the spark plug is provided with the usual tapered annular shoulder 2; and the shell 3 is provided with the usual tapered annular seat 4, between which shoulder and seat my improved gasket is intended to be placed.

The gasket casing is made of some suitable soft or pliable sheet metal 5, such as copper, bent to form a lateral bottom wall 6, inner and outer side walls 7 and 8, and a lateral top wall; said top wall being formed by turning the edges of the inner and outer side walls outwardly and inwardly, respectively, as shown at 9 and 10, leaving an annular slot between them. The casing is filled with a suitable yielding packing material, such, for instance, as asbestos fiber, which material normally projects through the annular slot in the lateral top wall, into position to engage the shoulder 2 of the insulator 1.

In the form shown in Figs. 1 to 4 inclusive, the inner and outer side walls of the casing are shown as curved, while in the form shown in Fig. 5, these walls are shown as straight.

The inner side wall 7 is preferably made shorter than the outer side wall 8, as shown, so as to make the gasket thinner at its inner periphery than at its outer periphery. However, the projection of the packing material through the annular slot in the lateral top wall of the casing, makes the gasket thicker between the inner and outer peripheries.

In making the gasket 10 it is formed into the shape shown either in Figs. 2 to 4 inclusive, or Fig. 5, where it will be observed that the gasket is slightly thinner at its inner periphery and thicker between said peripheries.

When the gasket is placed within the spark plug between the insulator and shell, and the insulator forced into its proper position within the shell, the shoulder 2 of the insulator will first engage the inner periphery of the gasket and then force the gasket into the tapered shape shown in Fig. 1, the tendency being to spread the gasket outwardly against the shell and, at the same time, force the outwardly and inwardly turned edges which form the lateral top wall of the gasket into the packing material tending to still further force the packing material upwardly through the annular slot in the lateral top wall of the gasket. This packing material will adapt itself to any unevenness in the shoulder of the insulator and thus form a gas-tight joint at this point.

The bore of the gasket is made sufficiently greater in diameter than the diameter of the insulator in the same plane, to insure the spacing of the inner periphery of the gasket from the outer periphery of the insulator, for absolutely preventing any lateral pressure against the insulator which would cause a shearing action tending to crack or break the insulator at this point.

It is evident that various changes may be resorted to in the form, construction and arrangement of the several parts without departing from the spirit and scope of my invention; hence I do not wish to limit myself strictly to the structure herein shown and described, but

What I claim is:

1. The combination with the shell and insulator of a spark plug, of a gasket interposed between a shoulder on the insulator and a seat on the shell, said gasket comprising a casing of suitable soft or pliable sheet metal bent to form a lateral bottom wall, inner and outer side walls and a lateral top wall having an annular slot therein, and a filling of suitable yielding packing material for the casing projecting through said annular slot into engagement with the insulator shoulder, the bore of the gasket being made sufficiently greater than the diameter of the insulator in the same plane, to insure the spacing of the inner periphery of the gasket from the outer periphery of the insulator for preventing lateral pressure against the insulator.

2. The combination with the shell and insulator of a spark plug, of a gasket interposed between a shoulder on the insulator and a seat on the shell, said gasket comprising a casing of suitable soft or pliable sheet metal bent to form a lateral bottom wall, inner and outer side walls and a lateral top wall having an annular slot therein, and a filling of suitable yielding packing material for the casing projecting through said annular slot into engagement with the insulator shoulder, the gasket being thinner at its inner periphery than at its outer periphery and thickest between said peripheries, the bore of the gasket being made sufficiently greater than the diameter of the insulator in the same plane, to insure the spacing of the inner periphery of the gasket from the outer periphery of the insulator for preventing lateral pressure against the insulator.

In testimony, that I claim the foregoing as my invention, I have signed my name this 16th day of August 1916.

ARTHUR R. MOSLER.